July 31, 1934.  E. HAMBLIN, JR  1,968,762
AUTOMOBILE SEAT VENTILATOR
Filed Aug. 4, 1933
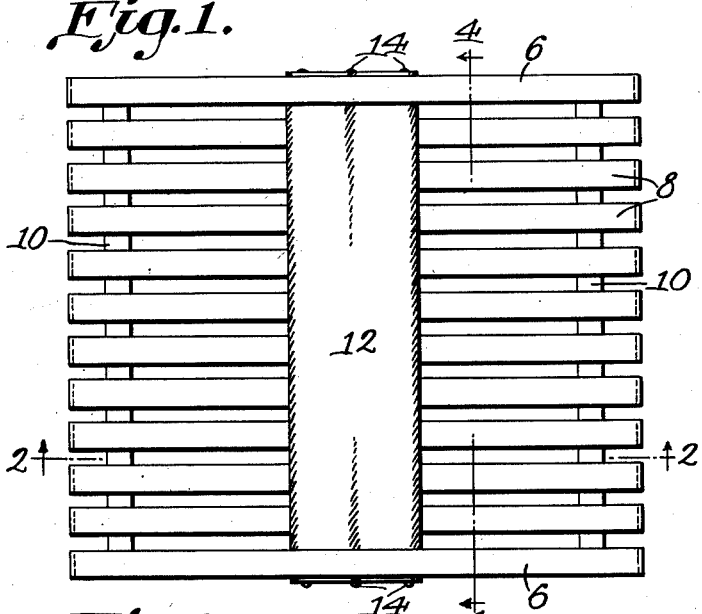
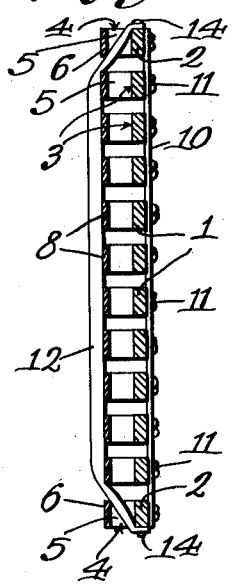
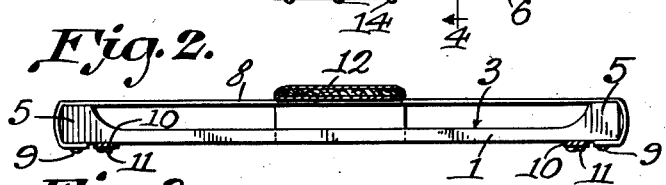
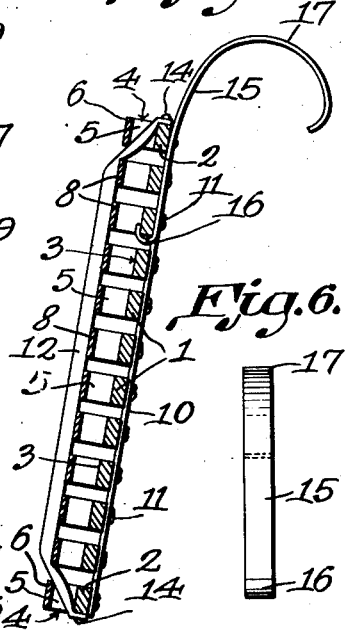
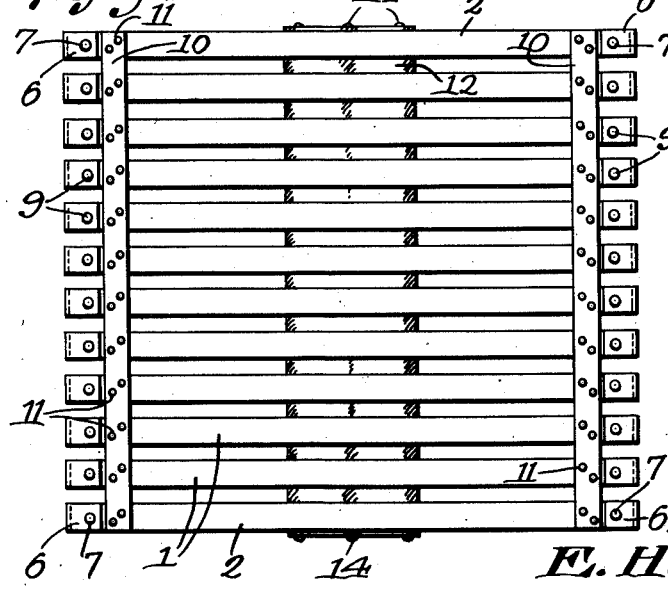
E. Hamblin, Jr. Inventor
Attorneys.

Patented July 31, 1934

1,968,762

UNITED STATES PATENT OFFICE 1,968,762

AUTOMOBILE SEAT VENTILATOR

Ed Hamblin, Jr., Woodward, Okla.

Application August 4, 1933, Serial No. 683,690

2 Claims. (Cl. 155—131)

The device forming the subject matter of this application is a seat member. By the term "seat member" it is meant that the article may be used to form either the bottom or the back of a seat. It is adapted to be employed primarily on an automobile seat, but can be used in a porch seat, in a grand-stand seat at a game, in a lawn seat, and, generally, in connection with all chairs or settees. The object of the invention, primarily, is to afford a ventilated seat member, which will afford coolness to the occupant. Another object of the invention is to provide a device of the class described which can be cheaply and inexpensively made. A further object of the invention is to provide a device of the class specified which will be comfortable to the user, and be capable of conforming to the body of the user, as well as to the chair or other object on which it is used.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in front elevation, a seat member constructed in accordance with the invention;

Fig. 2 is a section on the line 2—2 of Fig. 1;

Fig. 3 is a rear elevation;

Fig. 4 is a section on the line 4—4 of Fig. 1;

Fig. 5 is a section on the line 4—4 of Fig. 1, but showing the device used to form the back of the seat;

Fig. 6 is an elevation of the suspension member.

The device forming the subject matter of this application comprises any desired number of transverse, parallel, intermediate slats 1, preferably made of wood, and terminal slats 2, which also may be made of wood, if desired. The slats 1 and 2 are alike. In their forward edges, the slats 1 have elongated recesses 3, and in their forward edges, the terminal slats 2 have elongated recesses 4. The recesses 3 and 4 define forwardly extended projections 5 at the ends of the slats 1 and 2.

Resilient straps 6, made of fiber or any other suitable material, are extended longitudinally of the recesses 4 of the terminal slats 2. The straps 6 are extended across the forward edges of the projections 5, and backwardly around the projections, the ends of the straps 6 being connected to the rear edges of the slats 2 by securing elements 7. Like straps 8 are assembled in the same way with intermediate slats 1, and are connected thereto by securing elements 9, as shown in Figs. 2 and 3.

The slats 1 and 2 are held together, in the parallel relation of Figs. 1 and 3, by resilient strips 10, which may be made of fiber, the strips 10 being disposed in parallel relation, at right angles to the slats 1 and 2, and being attached to the rear edges of the slats by securing members 11.

A cushion 12 is provided, and is arranged at right angles to the straps 6 and 8. The cushion 12 is flexible, the cushion being made of any material suitable for the purpose in view. The cushion 12 is considerably narrower than the frame formed by the slats 1 and 2 and associated parts, as Figs. 1, 2 and 3 will show. The cushion 12 is disposed outside of the straps 8 of the intermediate slats 1 (Fig. 4) but the ends of the cushion 12 extend behind the terminal straps 6, through the recesses 4 of the terminal slats 2. The ends of the cushion 12 are attached to the edges of the terminal slats 2 by securing devices 14, the parts 14, 9, 7 and 11 being tacks, nails, screws or the like.

The straps 6 and 8 are drawn taut enough so that they can yield under the pressure of the body of the occupant without causing the straps to come into contact with the slats 1 and 2 at the bases of the recesses 3 and 4. The cushion 12 gives the occupant comfort along the spine, if the device is used as a seat back, and it gives him comfort elsewhere, if the article is used to form the base of a seat. A comparison of Figs. 1, 2 and 3 will show that ample ventilation is provided, corresponding coolness being the result. The structure shown in Figs. 1 and 4 can yield, because the strips 10 are resilient, and the device, therefore, will conform to the back or the base of the seat on which it is employed.

The article, if used to form the base of a seat, is simply laid down flat on the bottom of the seat. If used to form a back of a seat, it is employed as shown in Fig. 6 of the drawing. Under such circumstances, one or more suspension devices are resorted to. These suspension devices may be of any desired kind. In the drawing, one of them is designated by the numeral 15. The suspension devices 15, which may be made of fiber, or any other suitable material, have small hooks 16 at their lower ends, and large hooks 17 at their upper ends. The large hooks 17 are engaged over the back of the auto seat (not shown) or any other object whereon the structure shown in the drawing is used. The small hooks 16 may be engaged with any of the slats 1 or 2, and in this way the seat back can be adjusted vertically.

The article can be used to form a seat back, to form the base of the seat, or to form both the back and the base of the seat, if the operator wishes to use the structure in duplicate. But one form of the invention is required, regardless of whether the article is used as a seat back or a seat base, the only difference being the addition of the suspension devices 15.

Having thus described the invention, what is claimed is:

1. A seat-forming member comprising a plurality of approximately parallel slats provided in their forward faces with elongated recesses defining forwardly extended projections at the ends of the slats, resilient straps secured to the slats and extended between the projections, in spaced relation to the bases of the recesses, flexible connecting means joining the slats together in the aforesaid approximately parallel relation, a cushion, of appreciably less width than the seat-forming member, the cushion extending transversely of the straps, in spaced relation to the ends of the slats, and means for securing the cushion in place.

2. A seat-forming member comprising terminal slats and intermediate slats disposed between the terminal slats, all of the slats being arranged in approximately parallel relation, all of the slats being provided in their forward faces with elongated recesses defining forwardly extended projections at the ends of the slats, resilient straps secured to all of the slats and extended between the projections in spaced relation to the bases of the recesses, flexible connecting means joining all of the slats together in the aforesaid approximately parallel relation, and a cushion extended transversely of all of the straps, in front of the straps of the intermediate slats, the ends of the cushion being extended behind the straps of the terminal slats, and the ends of the cushion being secured to the terminal slats.

ED HAMBLIN, Jr.